United States Patent
Stogner et al.

(10) Patent No.: US 6,754,284 B2
(45) Date of Patent: Jun. 22, 2004

(54) METHOD AND APPARATUS FOR MINIMA ENLARGEMENT

(75) Inventors: Darrell James Stogner, Plantation, FL (US); Richard S. Young, Weston, FL (US); Karthik Narasimhan, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 37 days.

(21) Appl. No.: 10/225,982

(22) Filed: Aug. 22, 2002

(65) Prior Publication Data

US 2004/0042540 A1 Mar. 4, 2004

(51) Int. Cl.$^7$ .................... H04L 27/12; H04L 27/28
(52) U.S. Cl. .............. 375/295; 375/260; 370/343
(58) Field of Search ..................... 375/260, 261, 375/295, 296; 332/103, 117, 123, 125; 370/210, 319, 343, 344, 480; 455/23, 59, 39, 126

(56) References Cited

U.S. PATENT DOCUMENTS

| | | | | |
|---|---|---|---|---|
| 4,700,151 A | * | 10/1987 | Nagata | ................ 332/123 |
| 6,134,268 A | | 10/2000 | McCoy | |
| 6,147,984 A | | 11/2000 | McCoy | |
| 6,298,094 B1 | * | 10/2001 | Dehner et al. | ........... 375/295 |
| 6,456,669 B1 | * | 9/2002 | Sakoda | ................ 375/260 |
| 6,490,269 B1 | * | 12/2002 | Yamaura | .............. 370/343 |
| 6,591,090 B1 | * | 7/2003 | Vuorio et al. | ........... 455/126 |

* cited by examiner

*Primary Examiner*—Betsy L. Deppe

(57) ABSTRACT

A modulator (102) modulates a plurality of symbols to create a modulated signal. A transmitter is coupled to the modulator (102). The transmitter transmits the modulated signal if the modulated signal is above a threshold. A minima enlarger (104) is coupled to the modulator (102). The minima enlarger (104) computes an adjustment to the plurality of symbols if the modulated signal is below the threshold. A summer (106) is coupled to the modulator (102) and the minima enlarger (104). The summer (106) adds the adjustment to the plurality of symbols if the modulated signal is below the threshold.

17 Claims, 1 Drawing Sheet

METHOD AND APPARATUS FOR MINIMA ENLARGEMENT

FIELD OF THE INVENTION

The present invention relates generally to a method and apparatus for minima enlargement.

BACKGROUND OF THE INVENTION

Wireless telecommunication systems sometimes are divided into a series of cell areas covering a service area. Each cell area has a transmitting base station using an operating frequency set comprising a plurality of radio channels to communicate with mobile subscribers. Each channel represents an information signal at a particular frequency carrier or band.

In many instances it is advantageous to combine these channels for transmission purposes. The channels can all be combined by a broadband signal combiner into a multi-subchannel signal at lower power levels and then amplified by a single linear amplifier (or its equivalent, a plurality of linear amplifiers in parallel, each amplifying a reduced power version of the same multi-carrier sub-channel signal) to raise the multi-subchannel signal to an appropriate transmit power level.

As data rate requirements rise, the symbol rate necessary in forthcoming protocols will cause the modulation bandwidth to exceed the coherence bandwidth of the channel. This requires an expensive equalizer at the receiver to compensate for intersymbol interference created by the time dispersion in a multipath channel. Another application of multi-subchannel technology is to split the single, high symbol rate modulation into a plurality of lower rate sub-channels that each has a low enough modulation bandwidth to avoid the need for an adaptive equalizer.

Highly linear multi-subchannel modulations have large dynamic ranges where the minimum voltage can approach −50 dB or lower from the signal mean. This will essentially take the linear amplifier used to increase the power of the signal prior to transmission down to idle bias current and cause a spike in the load impedance with unpredictable results. In addition, with recent supply modulation techniques used to increase the linear amplifier efficiency, if the supply voltage approaches zero, the linear amplifier could have problems with phase, noise and stability.

In the past, floor clamp circuits have been employed to prevent the voltage from dropping below a specified threshold. This results in frequency domain splatter and a reduction in linearity of the signal. Furthermore, different types of signals can tolerate different amounts of distortion and thus different amounts of compression. Prior-art techniques have not attempted to tailor symbols on multiple subchannels, including empty subchannels, in a controlled, individualized manner to improve the minima to average power ratio.

Clearly then, a need exists for an improved method and apparatus for minima enlargement.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
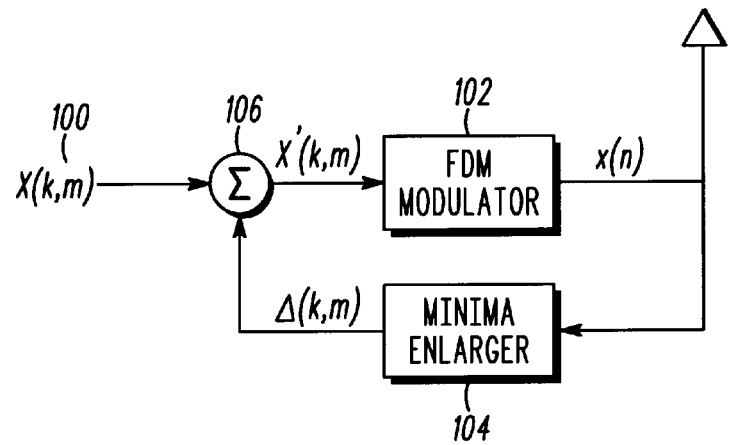
FIG. 1 illustrates a block diagram of a transmit modem in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

The present invention discloses an improved method and apparatus for minima enlargement in a modulator. The present invention allows control of the compression in accordance with the type of information being sent and will tailor symbols on multiple subchannels, including empty subchannels, in a controlled, individualized manner to improve the minima to average power ratio.

Turning to the figures, FIG. 1 illustrates a block diagram of the transmit modem with the iterative minima enlarger. As illustrated, the block diagram comprises an unmodulated symbols input 100, a frequency division multiplexing ("FDM") modulator 102, a minima enlarger 104, and a summation component 106. The unmodulated symbols, X(k, m) 100, is the complex baseband symbol matrix with k selecting the frequency axis, and m selecting the time axis. The FDM modulator 102 modulates symbols according to the following equation:

$$x(n) = \sum_{m=0}^{N_s-1} g[mI + (nD)_I] \sum_{k=0}^{M-1} X\left(k, \left\lfloor \frac{nD}{I} \right\rfloor - m\right) e^{j\frac{2\pi}{M}k(n)_M} \quad (1)$$

where, x(n)=the nth sample of the modulated output;
g=the pulse shaping filter;
$N_s$=the pulse shaping filter length (in units of symbol periods);
I=the filter interpolation rate;
D=the filter decimation rate; and
M=the number of subchannels.

The inner sum of equation (1) performs the mixing of the subchannels, and the outer sum of equation (1) performs the pulse shaping and rate change as described in greater detail in U.S. Pat. No. 6,134,268, titled "Apparatus for Performing a Non-Integer Sampling Rate Change in a Multichannel Polyphase Filter," which is herein incorporated by reference. It is known in the art that equation (1) can be efficiently implemented using an inverse fast Fourier transform ("IFFT") to perform the mixing as shown in equations (2) and (3) below:

$$x(n) = \sum_{m=0}^{N_s-1} g[mI + (nD)_I] x_r\left((n)_M, \left\lfloor \frac{nD}{I} \right\rfloor - m\right) \quad (2)$$

where $x_r(n,m)$ is given by:

$$x_r(n, m) = M \cdot \mathfrak{I}^{-1}\{X(k, m)\} = M \cdot \frac{1}{M} \sum_{k=0}^{M-1} X(k, m) e^{j\frac{2\pi}{M}kn} \quad (3)$$

It is important to note that the present invention is not limited to any particular method for performing FDM modulation, but rather, it should be obvious to those skilled in the art that the present invention can utilize any of the many available methods of performing FDM modulation and still remain within the spirit and scope of the present invention.

The minima enlarger 104 detects signal minima and computes an adjustment matrix that when combined with the unmodulated symbols, X(k,m), 100 enlarges the signal above the minima threshold, $M_p$. The signal minima is defined as any output sample whose magnitude is less than a specified minima threshold, $M_p$. The minima threshold, $M_p$, can either be predetermined or dynamically adjusted based on system needs. When the signal drops below the minima, the problems discussed in the background manifest themselves. The adjustment matrix of the present invention, however, brings the signal above the threshold and avoids the aforementioned problems.

The summation component combines the unmodulated symbols, X(k,m), 100 with an adjustment computed by the minima enlarger component 104.

Let us now focus the discussion on the minima enlarger component 104. When the minima enlarger component 104 detects a minima at output sample p with phase of $\phi_p$, as described by the following equation, $$|x(p)| < M_p \text{ with} \angle x(p) = \phi_p \tag{4}$$

it computes an additive symbol adjustment to X(k,m) called $\Delta(k,m)$ such that passing X'(k,m)=X(k,m)+$\Delta$(k,m) through the FDM modulator would result in $x'(p) \geq M_p$, where x'(p) is given by the following equation:

$$x'(p) = \sum_{m=0}^{N_s-1} g[mI+(pD)_I] \sum_{k=0}^{M-1} X'\left(k, \left\lfloor \frac{pD}{I} \right\rfloor - m\right) e^{j\frac{2\pi}{M}k(p)M}$$

$$= \sum_{m=0}^{N_s-1} g[mI+(pD)_I] \sum_{k=0}^{M-1} \left\{ X\left(k, \left\lfloor \frac{pD}{I} \right\rfloor - m\right) + \Delta\left(k, \left\lfloor \frac{pD}{I} \right\rfloor - m\right) \right\} e^{j\frac{2\pi}{M}k(p)M}$$

Noting that the system is linear, the contribution of $\Delta(k,m)$ to x'(p) can be treated separately:

$$x_\Delta(p) = \sum_{m=0}^{N_s-1} g[mI+(pD)_I] \sum_{k=0}^{M-1} \Delta\left(k, \left\lfloor \frac{pD}{I} \right\rfloor - m\right) e^{j\frac{2\pi}{M}k(p)M} \tag{6}$$

The minima enlarger 104 must find the $\Delta(k,m)$ such that:

$$|x(p)+x_\Delta(p)| \geq M_p \tag{7}$$

In practice, this may be accomplished by adjusting the minima such that $|x'(p)|=M_p \cdot \alpha$, with $\alpha > 1$. That is:

$$|x(p)+x_\Delta(p)| = M_p \cdot \alpha \tag{8}$$

Figure 2:
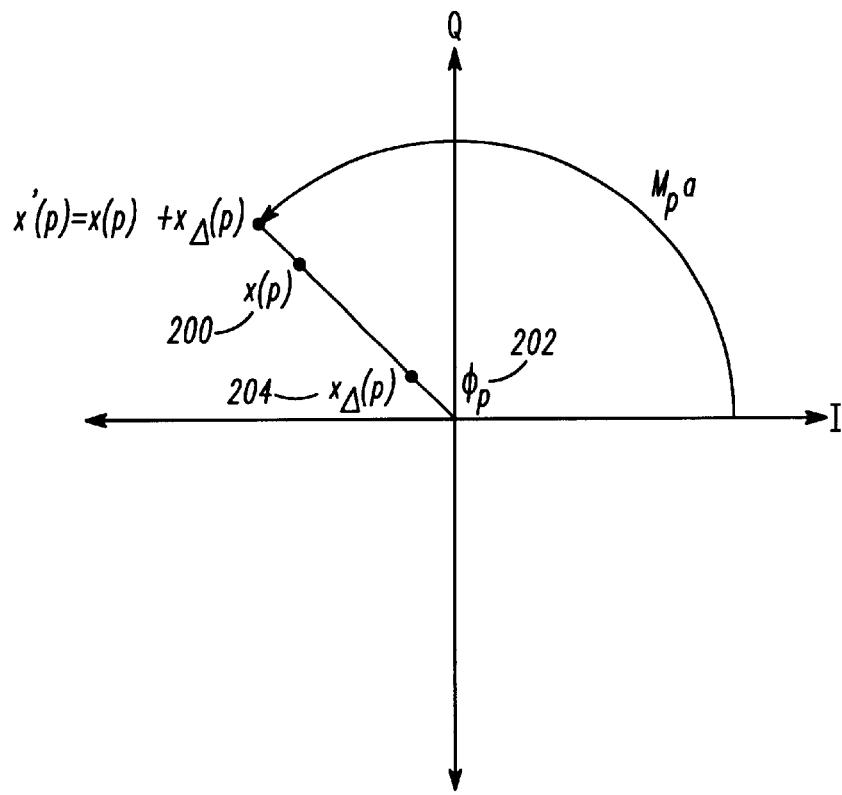
FIG. 2 illustrates a pictorial representation of minima enlargement in accordance with the present invention.

FIG. 2 pictorially illustrates minima enlargement. First, it should be noted that the magnitude of x(p) 200 is close to the origin, and hence the output of the linear amplifier is no longer reliable. Second, it should also be noted that $\phi_p$ 202, the phase of $x_\Delta(p)$ 204, is the same as the phase of x(p) 200. Making all contributions towards $x_\Delta(p)$ 204 coherent in this direction minimizes the magnitude.

Working from equation (6):

$$\angle x_\Delta(p) = \angle \sum_{m=0}^{N_s-1} g[mI+(pD)_I] \sum_{k=0}^{M-1} \Delta\left(k, \left\lfloor \frac{pD}{I} \right\rfloor - m\right) e^{j\frac{2\pi}{M}k(p)M} = \phi_p \tag{9}$$

$$\phi_p - \frac{2\pi}{M}k(p)_M = \sum_{m=0}^{N_s-1} \sum_{k=0}^{M-1} \angle \Delta\left(k, \left\lfloor \frac{pD}{I} \right\rfloor - m\right) \tag{10}$$

The optimal solution to this is to require each component of the double summation to have the necessary phase:

$$\angle \Delta\left(k, \left\lfloor \frac{pD}{I} \right\rfloor - m\right) = \tag{11}$$

$$\phi_p - \frac{2\pi}{M}k(p)_M \quad \text{for } 0 \leq k \leq M-1 \text{ and } 0 \leq m \leq N_s - 1$$

Now consider the magnitude $x_\Delta(p)$ 204. The total symbol error introduced is given by:

$$\sum_{m=0}^{N_s-1} \sum_{k=0}^{M-1} \left| \Delta\left(k, \left\lfloor \frac{pD}{I} \right\rfloor - m\right) \right| \tag{12}$$

In order to minimize this quantity, examine the magnitude of $x_\Delta(p)$ from equation (1):

$$\tag{5}$$

$$|x_\Delta(p)| = \left| \sum_{m=0}^{N_s-1} g[mI+(pD)_I] \sum_{k=0}^{M-1} \Delta\left(k, \left\lfloor \frac{pD}{I} \right\rfloor - m\right) e^{j\frac{2\pi}{M}k(p)M} \right| \tag{13}$$

$$= \sum_{m=0}^{N_s-1} |g[mI+(pD)_I]| \sum_{k=0}^{M-1} \left| \Delta\left(k, \left\lfloor \frac{pD}{I} \right\rfloor - m\right) \right| \tag{14}$$

The pulse-shaping filter is acting as a weighting function to the symbol adjustment matrix. Moving symbols that align with large filter coefficients have a greater impact on the magnitude than others. The pulse-shaping filter coefficients themselves can be used to weight the changes.

As a final component to $\Delta(k,m)$, it is noted that the various symbol types have different importance. For example, in most applications pilot and synchronization symbols should be altered much less than data symbols. Define W(km) as a matrix the same dimension as X(k,m) that contains weights for each entry in X(k,m). The complete equation for $\Delta(km)$ is given by:

$$\Delta(k,m) = C \cdot W\left(k, \left\lfloor \frac{pD}{I} \right\rfloor - m\right) \cdot g[mI+(pD)_I] \cdot e^{j(\phi_p - \frac{2\pi}{M}k(p)_M)} \tag{15}$$

The constant C is in place to ensure that the minima is sufficiently enlarged according to equation (8), after which, the linear amplifier will be operating in a region where the output is reliable:

$$|x_\Delta(p)+x(p)|=M_p\cdot a \Rightarrow M_p\cdot a-|x(p)|=x_\Delta(p) \quad (16)$$

$$M_p\cdot a-|x(p)| = \left|\sum_{m=0}^{N_s-1} g(mI+(pD)_I)\sum_{k=0}^{M-1}\Delta\left(k,\left\lfloor\frac{pD}{I}\right\rfloor-m\right)e^{j\frac{2\pi}{M}kn}\right| \quad (17)$$

$$= \left|\sum_{m=0}^{N_s-1} g(mI+(pD)_I)\right. \quad (18)$$

$$\left.\sum_{k=0}^{M-1} C\cdot W\left(k,\left\lfloor\frac{pD}{I}\right\rfloor-m\right)\cdot g(mI+(pD)_I)\cdot e^{j\left(\phi_p-\frac{2\pi}{M}k\right)}e^{j\frac{2\pi}{M}kn}\right|$$

$$= \left|\sum_{m=0}^{N_s-1} g^2(mI+(pD)_I)\sum_{k=0}^{M-1} C\cdot W\left(k,\left\lfloor\frac{pD}{I}\right\rfloor-m\right)\right| \quad (19)$$

Pulling C to the front, noting that $|g^2|=g^2$ and that W(k,m) is positive and real:

$$M_p\cdot a-|x(p)| = C\sum_{m=0}^{N_s-1} g^2(mI+(pD)_I)\sum_{k=0}^{M-1} W\left(k,\left\lfloor\frac{pD}{I}\right\rfloor-m\right) \quad (20)$$

$$C = \frac{M_p\cdot a-|x(p)|}{\sum_{m=0}^{N_s-1} g^2[mI+(pD)_I]\sum_{k=0}^{M-1} W\left(k,\left\lfloor\frac{pD}{I}\right\rfloor-m\right)} \quad (21)$$

Computing $\Delta(k,m)$ in this manner requires the re-computation of the IFFT for $x_r(n,m)$ in equations (2) and (3). It is more efficient to solve for $x'_r(n,m)$, the IFFT of $\Delta(k,m)$. Since the system is linear, the component from the symbol adjustment matrix can be computed and summed with $x_r(n,m)$:

$$x'_r(n,m)=x_r(n,m)+\delta_r(n,m) \quad (22)$$

where, $$\delta_r(n,m) = M\cdot \mathfrak{I}^{-1}\{\Delta(k,m)\} = M\cdot\frac{1}{M}\sum_{k=0}^{M-1}\Delta(k,m)e^{j\frac{2\pi}{M}kn} \quad (23)$$

Substituting for $\Delta(k,m)$ and using the pointer updates for k and m:

$$\delta_r(n,m) = \quad (24)$$

$$\sum_{k=0}^{M-1} C\cdot W\left(k,\left\lfloor\frac{nD}{I}\right\rfloor-m\right)\cdot g[mI+(nD)_I]e^{j\left(\phi_p-\frac{2\pi}{M}k(p)_M\right)}e^{j\frac{2\pi}{M}kn}$$

$$= C\cdot e^{j\phi_p}\sum_{k=0}^{M-1} W\left(k,\left\lfloor\frac{nD}{I}\right\rfloor-m\right)\cdot g[mI+(nD)_I]e^{j\left(\frac{2\pi}{M}k(n-p)_M\right)} \quad (25)$$

$$= C\cdot e^{j\phi_p}\cdot g[mI+(nD)_I]\sum_{k=0}^{M-1} W\left(k,\left\lfloor\frac{nD}{I}\right\rfloor-m\right)e^{j\left(\frac{2\pi}{M}k(n-p)_M\right)} \quad (26)$$

$$\delta_r(n,m) = C\cdot e^{j\phi_p}\cdot g[mI+(nD)_I]w_r\left((n-p)_M,\left\lfloor\frac{nD}{I}\right\rfloor-m\right) \quad (27)$$

Where $w_r(n,m)$ is defined as the one-dimensional IFFT of W(k,m) along the frequency axis:

$$w_r(n,m) = M\cdot\mathfrak{I}^{-1}\{W(k,m)\} = M\cdot\sum_{k=0}^{M-1} W(k,m)e^{j\left(\frac{2\pi}{M}kn\right)} \quad (28)$$

Thus, in a first embodiment, the present invention provides a method and apparatus for receiving a plurality of symbols, and modulating the plurality of symbols to create a first modulated signal. The first modulated signal is then compared to a threshold. If the first modulated signal is above the threshold, the first modulated signal is transmitted. If the first modulated signal, however, is below the threshold, an adjustment to the received plurality of symbols is computed and added to the received plurality of symbols to create an adjusted plurality of symbols. The adjusted plurality of symbols is then modulated to create a second modulated signal. The second modulated signal is transmitted if it exceeds the threshold; otherwise, the steps of computing, adding and the second step of modulating are repeated until the modulated signal exceeds the threshold.

In an alternative embodiment, the present invention provides a method and apparatus for receiving a plurality of symbols, mixing the plurality of symbols using an inverse fast Fourier transform to create a plurality of mixed symbols, and pulse shaping the plurality of mixed symbols to create a first modulated signal. The first modulated signal is then compared to a threshold. If the first modulated signal is above the threshold, the first modulated signal is transmitted. If the first modulated signal is below the threshold, an adjustment to the plurality of mixed symbols is computed and added to the plurality of mixed symbols to create an adjusted plurality of mixed symbols. Pulse shaping is performed on the adjusted plurality of mixed symbols to create a second modulated signal. As in the first embodiment, the second modulated signal is transmitted if the second modulated signal exceeds the threshold; otherwise, the steps of computing, adding and the second step of pulse shaping are repeated until the modulated signal exceeds the threshold.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
   receiving a plurality of symbols;
   modulating the plurality of symbols to create a first modulated signal;
   comparing the first modulated signal to a threshold;
   if the first modulated signal is above the threshold, transmitting the first modulated signal; and
   if the first modulated signal is below the threshold,
      computing an adjustment to the received plurality of symbols,
      adding the adjustment to the received plurality of symbols to create an adjusted plurality of symbols,
      modulating the adjusted plurality of symbols to create a second modulated signal, and
      transmitting the second modulated signal if the second modulated signal exceeds the threshold; otherwise, repeating the steps of computing, adding and the second step of modulating.

2. The method of claim 1 wherein the adjustment is computed with the following equation:

$$\Delta(k, m) = C \cdot W\left(k, \left\lfloor \frac{pD}{I} \right\rfloor - m\right) \cdot g[mI + (pD)_I] \cdot e^{j(\phi_p - \frac{2\pi}{M} k(p)_M)}$$

wherein:
k=frequency axis;
m=time axis;
C=a constant that ensures that minima is sufficiently enlarged;
W(k,m)=a matrix;
p=output sample;
D=filter decimation rate;
I=filter interpolation rate;
g=pulse shaping filter;
$\phi_p$=phase; and
M=number of subchannels.

3. The method of claim 1 wherein the threshold is predetermined.

4. The method of claim 1 wherein the threshold is dynamically adjusted.

5. The method of claim 1 wherein the plurality of symbols are divided in time and frequency.

6. The method of claim 5 wherein the step of modulating comprises at least one of mixing, pulse shaping, and rate changing the plurality of symbols.

7. A method comprising the steps of:
receiving a plurality of symbols;
mixing the plurality of symbols using an inverse fast Fourier transform to create a plurality of mixed symbols;
pulse shaping the plurality of mixed symbols to create a first modulated signal;
comparing the first modulated signal to a threshold;
if the first modulated signal is above the threshold, transmitting the first modulated signal; and
if the first modulated signal is below the threshold,
computing an adjustment to the plurality of mixed symbols,
adding the adjustment to the plurality of mixed symbols to create an adjusted plurality of mixed symbols,
pulse shaping the adjusted plurality of mixed symbols to create a second modulated signal, and
transmitting the second modulated signal if the second modulated signal exceeds the threshold; otherwise, repeating the steps of computing, adding and the second step of pulse shaping.

8. The method of claim 7 further comprising the step of changing a sampling rate of at least one of the first modulated signal and the second modulated signal.

9. The method of claim 7 wherein the adjustment is computed with the following equation:

$$\delta_r(n, m) = C \cdot e^{j\phi_p} \cdot g[mI + (nD)_I] w_r \left((n-p)_M, \left\lfloor \frac{nD}{I} \right\rfloor - m\right)$$

wherein:
n=time sample index
m=time axis;
C=a constant that ensures that minima is sufficiently enlarged;
p=output sample;
D=filter decimation rate;
I=filter interpolation rate;
g=pulse shaping filter;
$\phi_p$=phase; and
M=number of subchannels.

10. The method of claim 7 wherein the threshold is predetermined.

11. The method of claim 7 wherein the threshold is dynamically adjusted.

12. The method of claim 7 wherein the plurality of symbols are divided in time and frequency.

13. An apparatus comprising:
a modulator for modulating a plurality of symbols to create a modulated signal;
a transmitter, coupled to the modulator, for transmitting the modulated signal if the modulated signal is above a threshold;
a minima enlarger, coupled to the modulator, for computing an adjustment to the plurality of symbols if the modulated signal is below the threshold; and
a summer, coupled to the modulator and the minima enlarger, for adding the adjustment to the plurality of symbols if the modulated signal is below the threshold.

14. The apparatus of claim 13 wherein an output of the modulator is coupled to the input of the minima enlarger, an output of the minima enlarger is coupled to the input of the summer, and the output of the summer is coupled to the input of the modulator.

15. The apparatus of claim 14 wherein an output of the modulator is coupled to the transmitter.

16. The apparatus of claim 13 wherein a comparator is integrated within the modulator.

17. The apparatus of claim 13 wherein the modulator is a frequency division multiplexing modulator.

* * * * *